(12) United States Patent
He et al.

(10) Patent No.: US 8,576,758 B2
(45) Date of Patent: Nov. 5, 2013

(54) REMOTE WAKE-UP SYSTEM, WWAM MODULE AND TERMINAL

(75) Inventors: Zhiqiang He, Beijing (CN); Jiangwei Zhong, Beijing (CN); Xingwen Chen, Beijing (CN); Linjia Luo, Beijing (CN); Hai Wang, Beijing (CN); Yitang Zhuang, Beijing (CN); Ying Liang, Beijing (CN); Xiang Li, Beijing (CN); Xiaolin Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 937 days.

(21) Appl. No.: 12/443,348

(22) PCT Filed: Sep. 29, 2007

(86) PCT No.: PCT/CN2007/002862
§ 371 (c)(1),
(2), (4) Date: Jul. 2, 2009

(87) PCT Pub. No.: WO2008/043270
PCT Pub. Date: Apr. 17, 2008

(65) Prior Publication Data
US 2009/0323573 A1 Dec. 31, 2009

(30) Foreign Application Priority Data

Sep. 29, 2006 (CN) .......................... 2006 1 0141806
Oct. 26, 2006 (CN) .......................... 2006 1 0142705

(51) Int. Cl.
*G08C 17/00* (2006.01)
(52) U.S. Cl.
USPC ..................... 370/311; 340/343.1; 340/7.32

(58) Field of Classification Search
None
See application file for complete search history.

(56) References Cited

U.S. PATENT DOCUMENTS

| 6,101,608 | A  | * | 8/2000 | Schmidt et al. ................... 726/2 |
|---|---|---|---|---|
| 6,243,589 | B1 |  | 6/2001 | Novel |
| 6,618,584 | B1 | * | 9/2003 | Carneheim et al. ........... 455/411 |
| 6,708,879 | B2 | * | 3/2004 | Hunt .............................. 235/385 |
| 7,248,886 | B1 | * | 7/2007 | Ljungstroem et al. ........ 455/465 |
| 7,702,794 | B1 | * | 4/2010 | Hall et al. ...................... 709/227 |
| 2002/0007401 | A1 | * | 1/2002 | Suzuki .......................... 709/207 |
| 2002/0194486 | A1 | * | 12/2002 | Heinrich et al. ............... 713/200 |
| 2004/0068666 | A1 | * | 4/2004 | Tosey ............................ 713/201 |
| 2004/0124966 | A1 | * | 7/2004 | Forrest .......................... 340/5.8 |
| 2005/0085245 | A1 |  | 4/2005 | Danneels |
| 2005/0185623 | A1 | * | 8/2005 | Ray et al. ...................... 370/338 |
| 2005/0223248 | A1 |  | 10/2005 | Lim et al. |
| 2006/0022802 | A1 | * | 2/2006 | Bridgelall ................... 340/10.33 |
| 2006/0028986 | A1 | * | 2/2006 | Kwon et al. ................... 370/230 |
| 2006/0148534 | A1 | * | 7/2006 | Shih .............................. 455/574 |
| 2007/0100514 | A1 | * | 5/2007 | Park ................................. 701/2 |
| 2007/0109992 | A1 | * | 5/2007 | Bennett ........................ 370/328 |
| 2007/0140157 | A1 | * | 6/2007 | Fu et al. ....................... 370/318 |
| 2007/0285238 | A1 | * | 12/2007 | Batra .......................... 340/572.1 |

(Continued)

*Primary Examiner* — Bunjob Jaroenchonwanit
(74) *Attorney, Agent, or Firm* — Sills, Cummins & Gross P.C.

(57) ABSTRACT

Disclosed are a remote wake up system based on a WWAN module, a WWAN module and a terminal. The system includes a terminal; a WWAN module adapted to receive and/or send information in a wireless manner; and a security control module adapted to perform a security validation on the call information received by the WWAN module when the terminal is in a sleep state, and the security control module is further adapted to generate a wake-up signal and sending the wake-up signal to the terminal in order to wake up it, in the case of passing the security validation.

15 Claims, 4 Drawing Sheets

(56) References Cited

U.S. PATENT DOCUMENTS

| | | | |
|---|---|---|---|
| 2008/0004011 A1* | 1/2008 | Ober | 455/435.1 |
| 2008/0008161 A1* | 1/2008 | Aldaz et al. | 370/352 |
| 2008/0044014 A1* | 2/2008 | Corndorf | 380/37 |
| 2008/0056133 A1* | 3/2008 | Deshpande et al. | 370/235 |
| 2010/0275243 A1* | 10/2010 | Eldar | 726/2 |
| 2011/0138210 A1* | 6/2011 | Belali et al. | 713/323 |

* cited by examiner

REMOTE WAKE-UP SYSTEM, WWAM MODULE AND TERMINAL

BACKGROUND OF THE INVENTION

1. Field of Invention

The present invention relates to a remote wake-up technology in mobile communication system, in particular, to a remote wake-up system based on a WWAN (Wireless Wide Area Network) module, a WWAN module and a terminal.

2. Description of Prior Art

Connections between mobile terminals, such as mobile phones and notebooks, and Internet are becoming more convenient with the continuous development of mobile communication technology. With plugging of a communication card, i.e., a WWAN module (such as a wireless network card for GPRS, CDMA or 3G) to an interface in a notebook (such as a USB, a PCMCIA/Cardbus or a MiniPCIE), mobile networking in the notebook can be achieved. In addition, a SMS (Short Messaging Service) and a phone call can be carried out by the notebook.

As can be seen, a WWAN module is becoming a part of a standardized configuration of a notebook. Nowadays, a series of applications arise which remotely wakes up or starts a notebook using a WWAN module. There are many approaches for remotely waking up or starting a notebook using a WWAN module, the basic methods of which, however, are all based on a detection of the fluctuation of working current of the WWAN module.

However, the accuracy and stability of this method is rather poor. Generally, the reason is that the WWAN module itself will periodically search for base station during its sleep state, and its working current will increase during the search, which may cause the misoperation of waking up a terminal by the WWAN module. Also, this misoperation may occur due to a change in a power supply of the terminal or an external electromagnetic interference.

Additionally, the security of this method cannot be guaranteed. A power-on or wake-up signal will be generated once a phone call or short massage arrives, regardless of whether it is an actual power-on or wake-up signal. That is, there are no actual security validations on these signals.

Therefore, it is a technical problem to be solved how to provide an accurate and secure remote wake-up system based on a WWAN module and such a WWAN module.

SUMMARY OF INVENTION

It is an object of the present invention to provide a remote wake-up system based on a WWAN module and such a WWAN module in order to implement an accurate and secure remote wake-up technology based on a WWAN module.

In an aspect of the present invention, it provides a remote wake-up system comprising a terminal; a WWAN module adapted to receive and/or send information in a wireless manner; and a security control module adapted to perform a security validation on the call information received by the WWAN module when the terminal is in a sleep state; the security control module is further adapted to generate, in the case of a positive the security validation, a wake-up signal and send the wake-up signal to the terminal in order to wake it up.

According to an embodiment of the present invention, the security control module is implemented within the WWAN module.

According to an embodiment of the present invention, the security control module resides in a base band chip of a wireless sub-module, and is further adapted to send the wake-up signal to a connection bus between a bus connection module in the terminal and the wireless sub-module.

According to an embodiment of the present invention, the security control module is connected with a wireless sub-module, and is further adapted to send the generated wake-up signal to a connection bus between a bus connection module in the terminal and the wireless sub-module.

According to an embodiment of the present invention, the security control module is connected with the wireless sub-module via their respective communication interfaces.

According to an embodiment of the present invention, the communication interface is one of the following: a USB interface, a UART interface, a SPI interface, an I2C interface and a parallel communication interface of 8 bit/16 bit/32 bit.

According to an embodiment of the present invention, the security control module is further adapted to send, via a general purpose input/output port, the wake-up signal to the connection bus between the bus connection module in the terminal and a general purpose input/output port of the wireless sub-module.

According to an embodiment of the present invention, the terminal comprises a switch module adapted to switch the wake-up signal received from the WWAN module by the bus connection module to an embedded controller.

According to an embodiment of the present invention, the terminal further comprises a power module adapted to supply the bus connection module while the terminal is in the state of power-off or sleep.

According to an embodiment of the present invention, the power module comprises: a power adapter/battery unit, a voltage converter connected with the power adapter/battery unit, the embedded controller and the bus connection module, respectively, and a bus voltage converter connected with the power adapter/battery unit, the embedded controller and the bus connection module, respectively; the embedded controller being adapted to generate an enable signal for the voltage converter to supply the bus connection module when the terminal is in the state of power-off or sleep, and generate an enable signal for the bus voltage converter to supply the bus connection module when the terminal is in the state of power-on; the power converter being adapted to step down the voltage from the power adapter/battery unit to supply the bus connection module according to the enable signal from the embedded controller; and the bus voltage converter being adapted to step down the voltage from the power adapter/battery unit to supply the bus connection module according to the enable signal from the embedded controller.

According to an embodiment of the present invention, the security control module is implemented within the terminal.

According to an embodiment of the present invention, the terminal comprises a communication interface unit adapted to communicate with the WWAN module; and a power module adapted to supply the security control module and the communication interface unit.

According to an embodiment of the present invention, the security control module is further adapted to perform a security validation on information carried by the signal received from the communication interface unit, and generate, in the case of a positive security validation, a wake-up signal and send the wake-up signal to the embedded controller; the terminal further comprising an embedded controller for starting the terminal according to the received wake-up signal.

According to an embodiment of the present invention, the security control module comprises a microprogram controller connected with the power module and the embedded controller, respectively, and a communication interface controller connected with the microprogram controller and the communication interface unit, respectively; wherein the microprogram controller being adapted to: store security validation information and perform security validation on information carried by the signal received from the communication interface controller according to the stored security validation information, and generate, in the case of a positive security validation, a wake-up signal and send the wake-up signal to the embedded controller; send, when the terminal is in the state of power-off or sleep, a control signal to the communication interface controller to control it to be in a work state; send, when the terminal is in the state of power-on, a control signal to the communication interface controller to control it to be in an off state; and the communication interface controller is used to send the signal received from the communication interface unit to the microprogram controller according to the control signal therefrom.

According to an embodiment of the present invention, the security control module comprises a microprogram controller connected with the power module and the embedded controller, respectively, a communication interface controller connected with the microprogram controller and the communication interface unit, respectively, and a storage unit connected with the microprogram controller; wherein the storage unit being adapted to store security validation unit; the microprogram controller is used to: read security validation information stored in the storage unit; perform security validation on information carried by the signal received from the communication interface controller according to the read security validation information, and generate, in the case of a positive security validation, a wake-up signal and send the wake-up signal to the embedded controller; send, when the terminal is in the state of power-off or sleep, a control signal to the communication interface controller to control it to be in a work state; send, when the terminal is in the state of power-on, a control signal to the communication interface controller to control it to be in an off state; and the communication interface controller is used to send the signal received from the communication interface unit to the microprogram controller according to the control signal therefrom.

According to an embodiment of the present invention, the power module comprises a power adapter/battery unit, a voltage converter connected with the power adapter/battery unit, the embedded controller, the microprogram controller and the communication interface unit, respectively, and a spare voltage converter connected with the power adapter/battery unit, the embedded controller, the microprogram controller and the communication interface unit, respectively; the embedded controller being adapted to generate an enable signal for the voltage converter to supply the security control module and the communication interface module when the terminal is in the state of power-off or sleep, and generate an enable signal for the spare voltage converter to supply the security control module and the communication interface module when the terminal is in the state of power-on; the power converter being adapted to step down the voltage from the power adapter/battery unit to supply the security control module and the communication interface module according to the enable signal from the embedded controller; and the spare voltage converter being adapted to step down the voltage from the power adapter/battery unit to supply the security control module and the communication interface module according to the enable signal from the embedded controller.

According to an embodiment of the present invention, the communication interface controller is disposed in the south bridge of the terminal.

In another aspect of the present invention, it provides a terminal for supporting the remote wake-up of a WWAN module is provided, comprising a communication interface unit adapted to communicate with the WWAN module; a security control module adapted to perform a security validation on the call information received by the WWAN module when the terminal is in a sleep state; and a power module adapted to supply the security control module and the communication interface unit; wherein the security control module generates, in the case of a positive the security validation, a wake-up signal and sending the wake-up signal to the terminal in order to wake it up.

In an further aspect of the present invention, it provides a WWAN module for supporting the remote wake-up of a terminal, comprising a wireless sub-module; wherein the terminal further comprises a security control module adapted to perform, according to security validation information stored therein, a security validation on the call information received by the wireless sub-module, and generate and output a wake-up signal for the call information passed the security validation.

With the system and apparatus according to the present invention, an accurate and secure remote wake-up based on a WWAN module can be achieved by performing a security validation on received information using a security validation module in a terminal.

The above objects, advantages and features of the present invention will be further detailed with reference to the following detailed description on the preferred embodiments taken conjunction with the drawings.

DETAILED DESCRIPTION OF THE PREFERRED EMBODIMENTS

The specific embodiments of the present invention will be detailed in the following with reference to the drawings.

[The First Embodiment]

Figure 1:
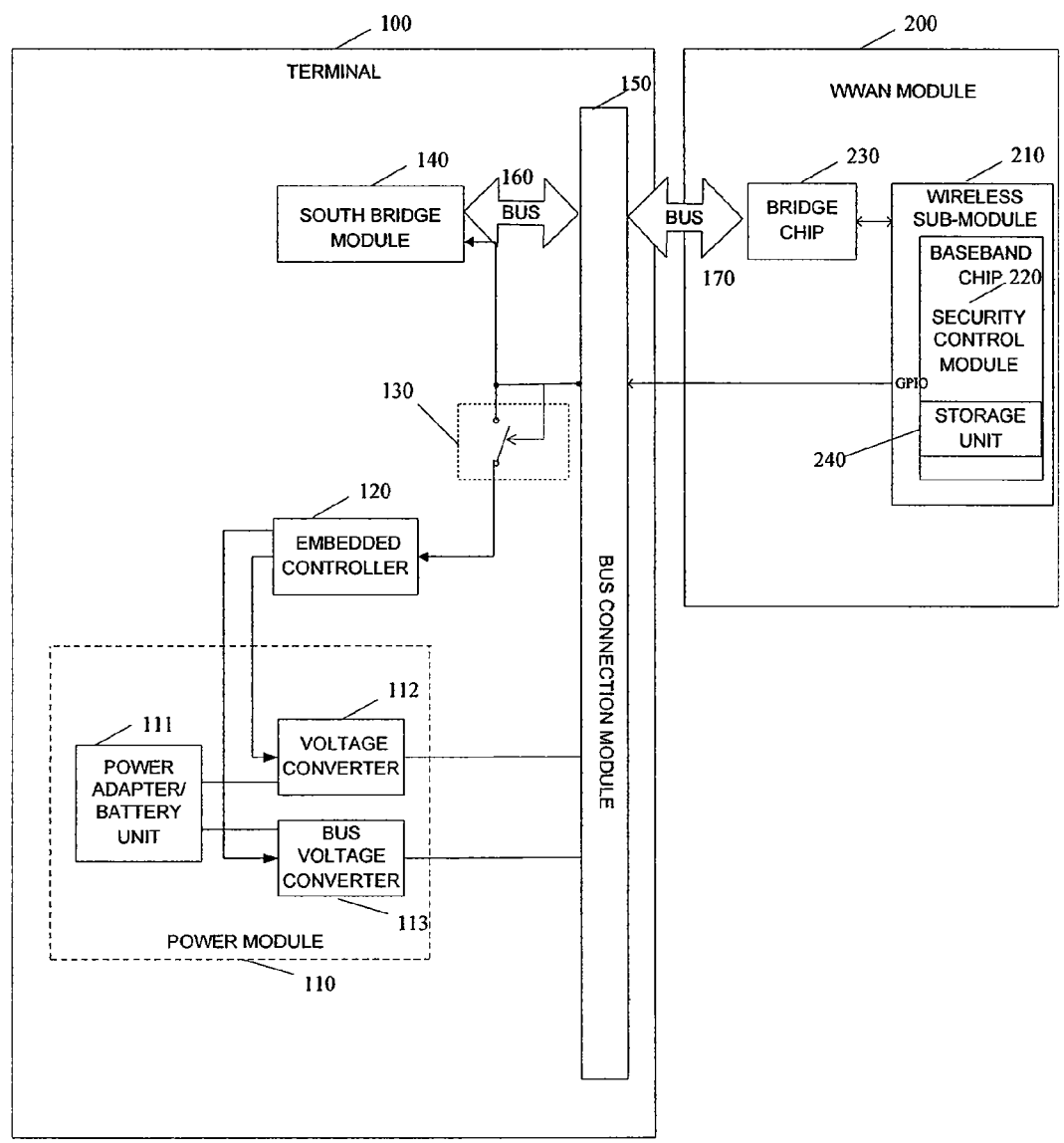
FIG. 1 is a structure illustration of a system according to the first embodiment of the present invention.

Referring to FIG. 1, the system according to the first embodiment of the present invention may comprise a terminal 100 (such as a PC, a notebook, or a computer) and a WWAN module 200 (such as a wireless network card for GPRS, CDMA or 3G).

The WWAN module 200 comprises a wireless sub-module 210 and a bridge chip 230. A baseband chip in the wireless sub-module 210 comprises a storage unit 240 with a security control module 220 implemented therein. Security validation information is stored in the storage unit 240.

The security control module 220 may perform a security validation on the call information received by the wireless sub-module 210 via the bridge chip 230 according to the security validation information stored in the storage unit 240, and generate and send a wake-up signal to the terminal 100 for the call information passed the security validation.

The terminal 100 may comprise an embedded controller (EC) 120, a power module 110 and a bus connection module 150 (such as a PCMCIA/Cardbus bus connector or a miniPCIE bus connector).

The embedded controller 120 may start the terminal based on the received wake-up signal.

The power module 110 may supply the bus connection module 150.

Particularly, the power module 110 may comprise a power adapter/battery unit 111, a voltage converter 112 (such as a DC-DC/LDO and a switch mode regulated power supply/low voltage stepping down device) connected with the power adapter/battery unit 111, the embedded controller 120 and the bus connection module 150, respectively, and a bus voltage converter 113 (such as a Cardbus bus voltage converter and a miniPCIE bus voltage converter) connected with the power adapter/battery unit 111, the embedded controller 120 and the bus connection module 150, respectively. Here, a Cardbus bus voltage converter is used as the bus voltage converter when the PCMCIA/Cardbus bus connector is used as the bus connection module 150 and a miniPICE bus voltage converter is used as the bus voltage converter when the miniPICE bus connector is used as the bus connection module 150.

The embedded controller 120 may generate an enable signal for the voltage converter 112 to supply the bus connection module 150 when the terminal is in the state of power-off or sleep, and generate an enable signal for the bus voltage converter 123 to supply the bus connection module 150 when the terminal is in the state of power-on.

The power converter 112 may steps down the voltage from the power adapter/battery unit 111 to supply the bus connection module 150 according to the enable signal from the embedded controller 120.

The bus voltage converter 113 may step down the voltage from the power adapter/battery unit 111 to supply the bus connection module 150 according to the enable signal from the embedded controller 120.

In the system described above, the wireless sub-module 210 in the WWAN module 200 performs bus communication with a PCMCIA/Cardbus bus connector when the PCMCIA/Cardbus bus connector is used as the bus connection module 150. The wireless sub-module 210 in the WWAN module 200 communicates with a mimiPCIE bus connector directly via a USB interface when the mimiPCIE bus connector is used as the bus connection module 150. For the system according to the present invention, any one of the implementations for the bus connection module is possible.

The system shown in FIG. 1 will be further detailed in the following taking as an example a structure where a PCMCIA/Cardbus bus connector is used as the bus connection module 150, a Cardbus bus voltage converter is used as the bus voltage converter 113, and the security control module 220 in the WWAN module is located in the baseband chip of the wireless sub-module 210.

First, a user can perform an enable configuration for the embedded controller 120 by using software or a BIOS functional configuration so that the embedded controller 120 only generates an enable signal for the voltage converter 112 when the terminal is in the state of power-off or sleep, while only generating an enable signal for the Cardbus bus voltage converter when the terminal is in the state of power-on. In this way, it can be ensured that the bus connection module 150, i.e., the PCMCIA/Cardbus bus connector can always be supplied with power regardless of the power-on, power-off or sleep state of the terminal.

Then, the user can preset the security validation information in the storage unit 240 of the security control module 220 in the WWAN module 200 using the terminal 100. First, the security validation information set by the user passes through the PCMCIA/Cardbus bus connector 150 to the bus, then arrives at the bridge chip 230 in the WWAN module 200, which send the received security validation information to the storage unit 240 of the security control module 220 in the baseband chip for setting of the security validation information.

When the terminal 100 is the state of power-off or sleep, after a call signal or a short message is received by the wireless sub-module 210 in the WWAN module 200, the security control module 200 in the baseband chip of the wireless 30 sub-module 210 performs a security validation on the received call signal or short message based on the setting of the security validation information in the storage unit 240. For example, a user identity of the call signal or the short message can be validated first to confirm the identity of the calling party. In the case of a valid instruction from a valid user, the received information can be further parsed to determine whether it is required to generate a wake-up signal or to perform other further operations, e.g., to perform a location tracking of a stolen notebook or even initiate a self-destruction program for the hard drive of a stolen notebook. Furthermore, the security module 220 can automatically reply a processing result or regularly reply state information to a valid calling party. Here, the wake-up signal generated by the security control module 220 and other designations for further operations on the terminal are sent via a General Purpose Input/Output (GPIO) in the wireless sub-module 210 to the PCMCIA/Cardbus bus connector, through which they finally arrive at the embedded controller 120 to wake up the terminal or perform further related instructions.

Figure 2:
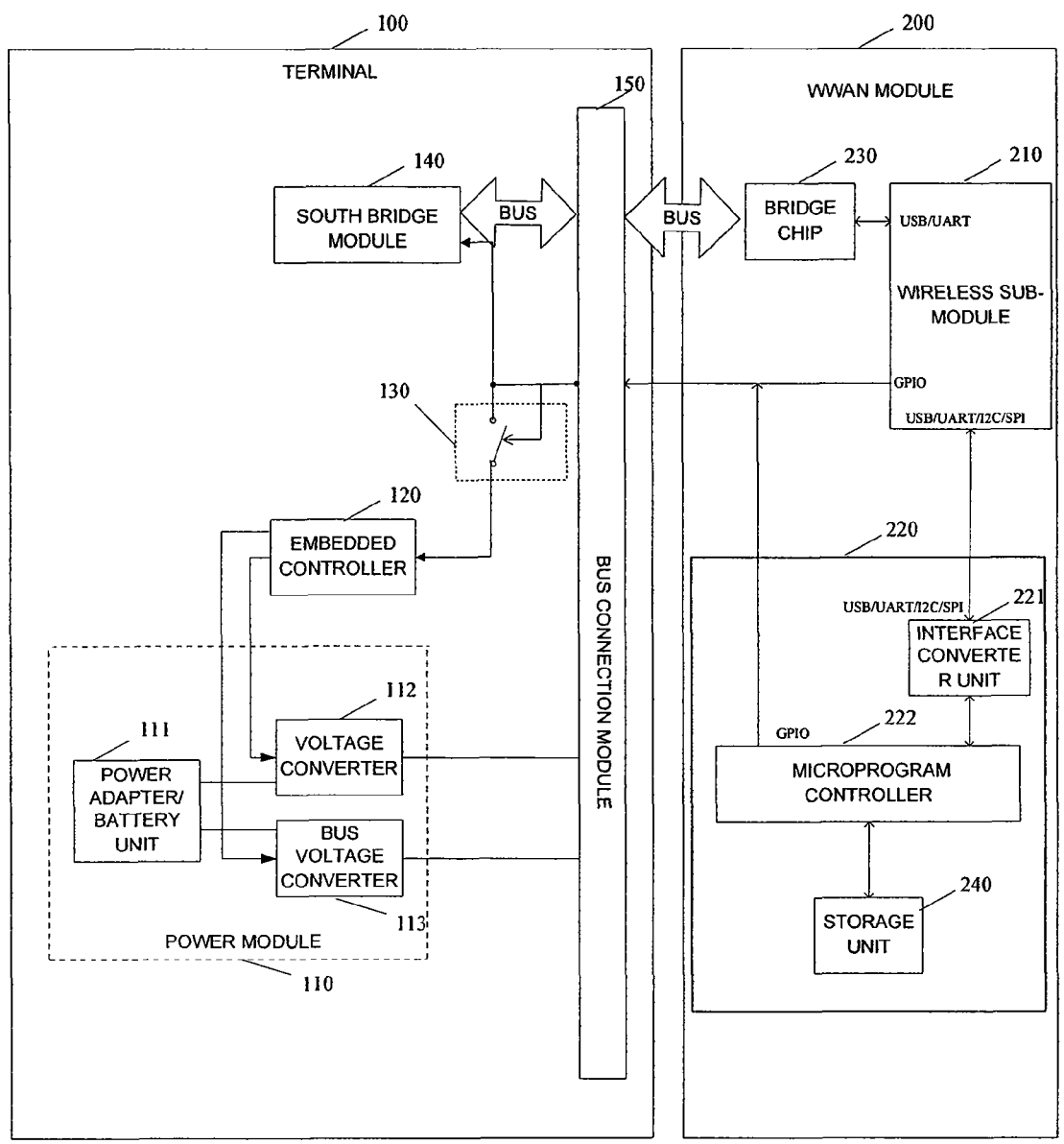
FIG. 2 is a structure illustration of a variant system according to the first embodiment of the present invention.

The system according to the first embodiment of the present invention can employ the variant structure shown in FIG. 2, with the only difference consisting in that the security control module 220 is a separate module independent from the wireless sub-module 210. It comprises an interface 221, a microprogram controller 222 and a storage unit 240 with the setting of security validation information stored therein. The security control module 220 and the wireless sub-module 210 communicates with each other via their respective interface, such as a USB, a UART, a I2C or a SPI serial port, or a 8 bit/16 bit/32 bit parallel port. The configuration of the security validation information received by the wireless sub-module 210 from the terminal 100 is received by the security control module 220 via the interface 211 (such as a serial port or a 8 bit/16 bit/32 bit parallel port) and stored in the storage unit 240. Additionally, the security control module 220 receives the call information or short message received by the wireless sub-module 210 and sends the information to be fed back to the calling party after the security validation to the wireless sub-module 210 via the serial port or the 8 bit/16 bit/32 bit parallel port. Also, after performing the security validation on the received information based on the configuration of the security validation information stored in the storage unit 240, the security module 220 generates a wake-up signal for the terminal or other instructions for further operations on the terminal in the case of a valid information from a valid user. Here, the wake-up signal for the terminal and other instructions for further operations on the terminal are sent via a GPIO in the security control module 220 to the bus which is the bus being led from the GPIO of the wireless sub-module 210 to the bus connection module 150. As other procedures of the system shown in FIG. 2 are similar to that of the system shown in FIG. 1, the description thereof is omitted herein.

Furthermore, in the system shown in FIGS. 1 and 2, a switch module 130 (such as a switcher) can be added between the bus connection module 150 and the embedded controller 120 taking the compatibility with other common bus devices into consideration. In other words, when the bus connection module 150 is connected with the WWAN module and receives a wake-up signal, a switcher in the switch module 130 is closed to switch the wake-up signal to the embedded controller 120. On the other hand, when the bus connection module 150 is connected with another common bus device and receives a signal from the common bus device, the switcher in the switch module 130 is in a non-closed state. In other words, the bus led from the bus connection module 130 performs a function defined according to corresponding bus specifications in the prior art to send the signal directly to the south bridge module 140. For example, when a PCMCIA/Cardbus bus connector is used as the bus connection module 150, the signal is directly sent to the south bridge controller. When a miniPCIE bus connector is used as the bus connection module 150, the signal is sent to the south bridge chip.

With the system and WWAN module according to the first embodiment of the present invention, an accurate and secure remote wake-up technology can be achieved. Further, the cost can be reduced since there is no need to change the main board on the terminal side.

[The Second Embodiment]

Figure 3:
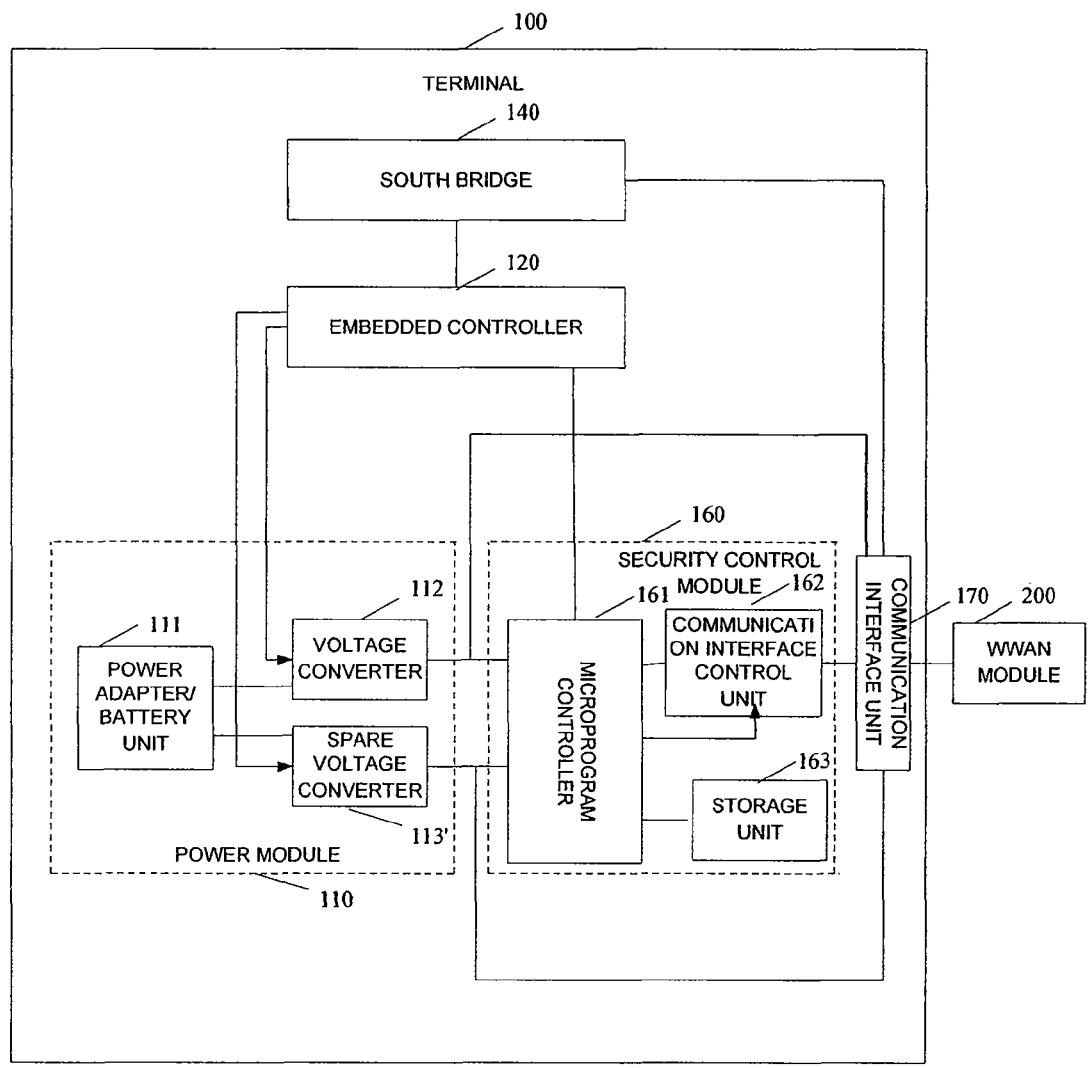
FIG. 3 is a structure illustration of a remote wake-up system based on a WWAN module according to the second embodiment of the present invention.

FIG. 3 shows a remote wake-up system based on a WWAN module according to the second embodiment of the present invention, which comprises a terminal 100 (such as a PC, a notebook and the like) and a WWAN module 200 with a USB interface (such as a wireless network card for GPRS, CDMA or 3G).

The terminal 100 may comprise an embedded controller (EC) 120, a power module 110, a security control module 160 and a communication interface unit (such as a USB interface and a 1394 interface) 170. The power module 110 may comprise a power adapter/battery unit 111, a voltage converter 112 (such as a DC-DC/LDO and a switch mode regulated power supply/low voltage stepping down device), and a spare voltage converter 113' (such as a USB switch mode regulated power supply and a 1394 voltage converter). The security control module 160 may comprise a microprogram controller 161 (such as a Micro Controller Unit, MCU), a communication interface controller 162 (such as a USB controller and a 1394 controller), and a storage unit 163 (such as an E2PROM, a Flash ROM and the like).

When a USB interface is used as the communication interface unit 170, a USB controller is used as the communication interface controller 162 and a USB voltage converter or a USB switch mode regulated power supply is used as the spare voltage converter 113'.

When a 1394 interface is used as the communication interface unit 170, a 1394 controller is used as the communication interface controller 162 and a 1394 voltage converter is used as the spare voltage converter 113'.

The power module 110 may supply the security control module 160 and the communication interface unit 170.

The security control module 160 may perform a security validation on information carried by the signal received from the communication interface unit 170, and to generate, in the case of a positive security validation, a wake-up signal and send the wake-up signal to the embedded controller 120.

The embedded controller 120 may start the terminal according to the received wake-up signal.

In such a case, the voltage converter 112 is connected with the embedded controller 120, the power adapter/battery unit 111, the microprogram controller 161 and the communication interface unit 170, respectively. The spare voltage converter 113' is connected with the embedded controller 120, the power adapter/battery unit 111, the microprogram controller 161 and the communication interface unit 170, respectively. The microprogram controller 161 is further connected with the embedded controller 120, a communication interface controller 162 and the storage unit 163. The communication interface controller 162 is further connected with the communication interface unit 170. The terminal 100 is connected with the WWAN module 200 with a communication interface unit via the communication interface unit 170.

First, a user can perform an enable configuration for the embedded controller 120 by using software or a BIOS functional configuration so that the embedded controller 120 only generates an enable signal for the voltage converter 112 when the terminal is in the state of power-off or sleep, while only generating an enable signal for spare voltage converter 113' when the terminal is in the state of power-on.

When the terminal 100 is in the state of power-off or sleep, the embedded controller 120 only generates an enable signal for the voltage converter 112, so that the voltage converter 112 can step down the voltage from the power adapter/battery unit 111 to convert it to, for example, +5V, and at the same time supply the microprogram controller 161 and the communication interface unit 170. The microprogram controller 161 generates a control signal and sends it to the communication interface controller 162, so that the communication interface controller 162 can be in the work state, i.e., can send data received by the communication interface unit 170 to the microprogram controller 162. At this time, if a short message or a call is received, the WWAN module 200 with a communication interface unit can send, via the communication interface unit 170 in the terminal, related information to the communication interface controller 162 which send the information to the microprogram controller 161 via an interface taking a form of USB/UARR/GPIO, etc. The microprogram controller 161 sends, via the communication interface controller 170, a command to the communication interface unit 170 and thus to WWAN module 200 in order to acquire the short message information or the call information. The microprogram controller 161 extracts user information and performs a security validation on the extracted user information according to the security validation information acquired from the storage unit 163. Here, the security validation information acquired from the storage unit 163 can be preset in the storage unit 163 or can be configured or updated in the storage unit 163 by the user after the terminal is power on.

In the case of a positive security validation, the microprogram controller 161 sends an ON signal to the embedded controller 120 which then starts or wakes up the terminal and only generates an enable signal for the spare voltage converter 113'. The spare voltage converter 113 then steps down the voltage from the power adapter/battery unit 111 to convert it to, for example, +5V, in order to supply the microprogram controller 161 and the communication interface unit 170. At the same time, the microprogram controller 161 sends a control signal to the communication interface controller 162 so that it can be in an off state, i.e., the communication interface controller is in a high resistance state which is equivalent to be disconnected. In such a case, if data are received by the USB interface, they can only be sent to the south bridge 140. The description of this function is omitted as it is identical to that of the prior art.

In the case of a negative validation, the user information is discarded by the microprogram controller 161.

In the system described above, the security validation information stored in the storage unit 163 can be stored in the microprogram controller 161 to remove a separate storage unit. In this way, the security validation information can also be preset or can be configured or updated by the user after the terminal is power on.

In the system described above, the structure of the microprogram controller 161 and the communication controller 162 is implemented as separate components; however, it can be implemented using an existing DSP (Digital Signal Processor) or an ASIC (Application Specific Integrated Circuits) chip provided with a communication interface controller. Alternatively, it can be implemented using a CPLD (Complex Programmable Logic Device) or a FPGA (Field Programmable Gate Array).

Figure 4:
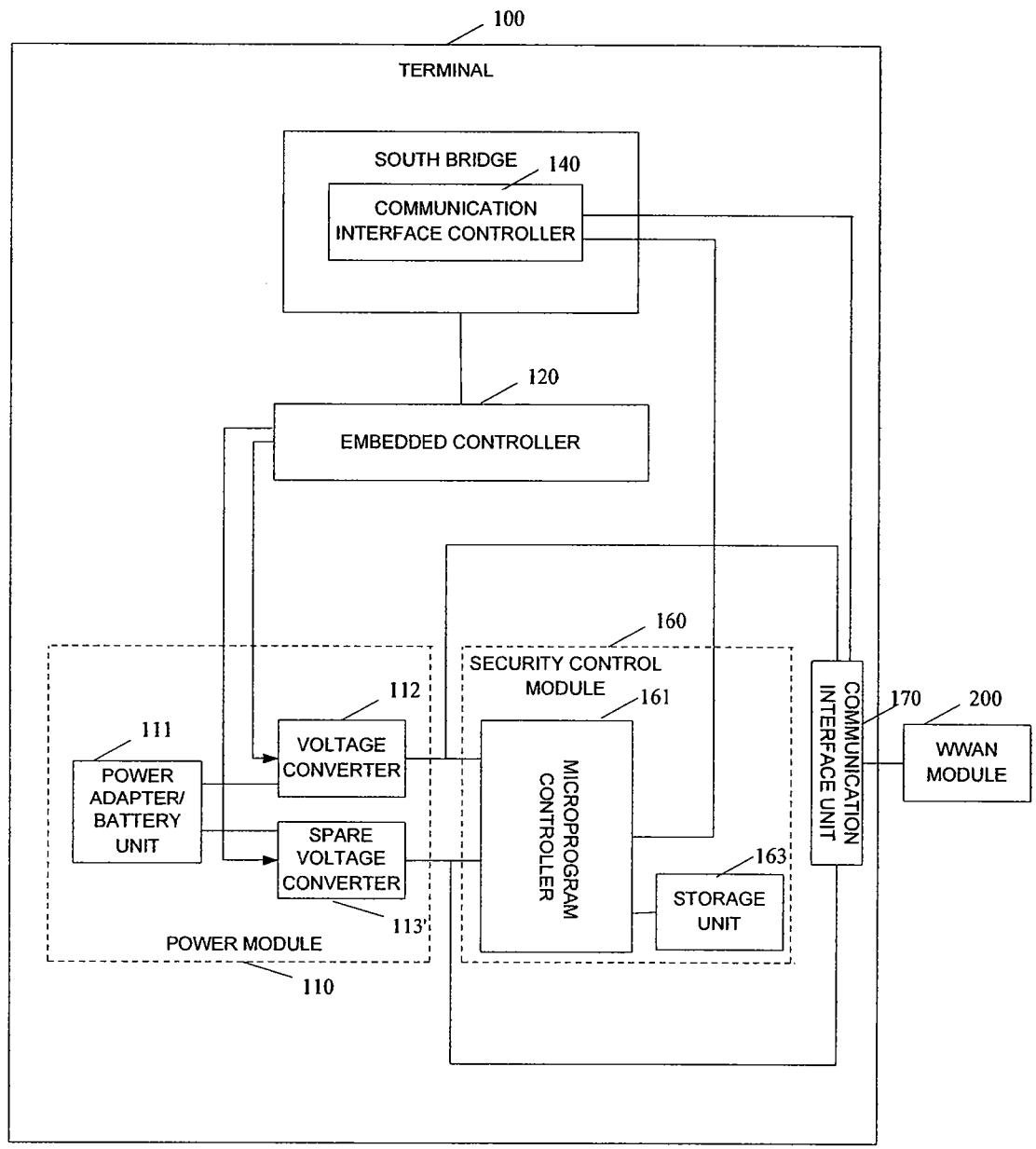
FIG. 4 is a structure illustration of a variant remote wake-up system based on a WWAN module according to the second embodiment of the present invention.

As shown in FIG. 4, the communication interface controller 162 can be implemented using a communication interface controller in the south bridge 140, such as a USB controller or a 1394 controller, the working process of which being omitted herein as it is similar to that of the system shown in FIG. 3.

The remote wake-up system based on a WWAN module, the WWAN module and the terminal according to the present invention are not limited to the applications enumerated in the descriptions and embodiments above. They can be applied to the various application fields to which the present invention is applicable. Other advantages and modifications can be made readily by those skilled in the art. Therefore, the present invention is not limited to the specific details, representative devices and illustrations shown and described herein without departing from the spirits and scopes of the general concepts defined in the claims and their equivalents.

What is claimed is:

1. A remote wake-up system comprising:
a terminal;
a WWAN module configured to receive and/or send information in a wireless manner; and
a security control module configured to perform a security validation on the information received by the WWAN module when the terminal is in a sleep state, and to generate, in the case of a positive the security validation, a wake-up signal and send the wake-up signal to the terminal in order to wake it up;
wherein the WWAN module comprises a wireless sub-module having a baseband chip on which the security control module resides, the terminal comprises a bus connection module, and a connection bus is provided between the bus connection module and the wireless sub-module,
wherein the security control module is configured to send the generated wake-up signal to the bus connection module of the terminal via the connection bus,
wherein the terminal further comprises a switch provided between the bus connection module and an embedded controller,
wherein the switch is kept open, and is changed to be closed only when the bus connection module receives the wake-up signal via the connection bus, so that the bus connection module is connected to the embedded controller, and the received wake-up signal is passed to the embedded controller for waking up the terminal, and
wherein the terminal further comprises a power module configured to supply the bus connection module while the terminal is in a power-off state or the sleep state, the power module having a voltage converter and a bus voltage converter, the voltage converter being configured to supply a voltage to the bus connection module when the terminal is in the power-off state or the sleep state, and the bus voltage converter being configured to supply a voltage to the bus connection module when the terminal is in a power-on state.

2. The system according to claim 1, wherein the security control module is further configured to send the wake-up signal to the connection bus via a general purpose input/output port of the wireless sub-module.

3. The system according to claim 1, wherein
the power module further comprises a power adapter/battery unit connected with the voltage converter and the bus voltage converter,
wherein the embedded controller is configured to generate an enable signal for the voltage converter to supply the bus connection module when the terminal is in the power-off state or the sleep state, and generate an enable signal for the bus voltage converter to supply the bus connection module when the terminal is in the power-on state,
wherein the power converter is configured to step down the voltage from the power adapter/battery unit to supply the bus connection module according to the enable signal from the embedded controller when the terminal is in the power-off state or the sleep state, and
wherein the bus voltage converter is configured to step down the voltage from the power adapter/battery unit to supply the bus connection module according to the enable signal from the embedded controller when the terminal is in the power-off state or the sleep state.

4. A remote wake-up system comprising:
a terminal;
a WWAN module configured to receive and/or send information in a wireless manner; and
a security control module configured to perform a security validation on the information received by the WWAN module when the terminal is in a sleep state, and to generate, in the case of a positive the security validation, a wake-up signal and send the wake-up signal to the terminal in order to wake it up;
wherein the terminal is configured to communicate with the WWAN module, and the security control module is implemented within the terminal,
the security control module comprises a microprogram controller, and a communication interface controller connected to the microprogram controller and the terminal,
wherein the communication interface controller is configured to receive the information received by the WWAN module via the terminal, and send the information to the microprogram controller,
the microprogram controller is configured to perform security validation on information received from the communication interface controller according to stored security validation information, and to generate and send the wake-up signal to the terminal via the communication interface controller; and
the microprogram controller is further configured to send, when the terminal is in a power-off state or the sleep state, a first control signal to the communication interface controller to control it to be in a work state, and to send, when the terminal is in a power-on state, a second control signal to the communication interface controller to control it to be in an off state,
wherein the terminal comprises a power module configured to supply power to the security control module when the terminal is in the power-off state or the sleep state, wherein the power module comprises a voltage converter and a spare voltage converter, the voltage converter being configured to supply the security control module when terminal is in the power-off state or the sleep state, and the spare voltage converter being configured to supply the security control module when the terminal is in a power-on state.

5. The system according to claim 4, wherein the terminal comprises a communication interface unit configured to communicate with the WWAN module and connected to the communication interface controller of the security control module; and the power module is configured to supply power to the communication interface unit.

6. The system according to claim 5, wherein the communication interface unit is further configured to received the information from the WWAN module and send the information to the communication interface controller, and to receive the wake-up signal from the communication interface controller of the security control module, the terminal further comprises an embedded controller configured to receive wake-up signal from the communication interface unit and to start the terminal according to the received wake-up signal.

7. The system according to claim 6, wherein the security control module further comprises a storage unit connected to the microprogram controller;

wherein the storage unit is configured to store the security validation information.

8. The system according to claim 6, wherein the microprogram controller is connected to the power module and the embedded controller.

9. The system according to claim 8, wherein the power module further comprises a power adapter/battery unit connected with the voltage converter and the spare voltage converter, wherein the embedded controller is configured to generate an enable signal for the voltage converter to supply the security control module and the communication interface module when the terminal is in the power-off state or the sleep state, and generate an enable signal for the spare voltage converter to supply the security control module and the communication interface module when the terminal is in the power-on state, wherein the voltage converter is configured to step down the voltage from the power adapter/battery unit to supply the security control module and the communication interface module according to the enable signal from the embedded controller when the terminal is in the power-off state or the sleep state, and wherein the spare voltage converter is configured to step down the voltage from the power adapter/battery unit to supply the security control module and the communication interface module according to the enable signal from the embedded controller when the terminal is in the power-on state.

10. The system according to claim 6, wherein the communication interface controller is disposed in the south bridge of the terminal.

11. A terminal, comprising:

a communication interface unit configured to communicate with a WWAN module;

a security control module configured to perform a security validation on information received by the WWAN module when the terminal is in a sleep state; and a power module configured to supply power to the security control module and the communication interface unit;

wherein the security control module is further configured to generate, in the case of a positive the security validation, a wake-up signal and sending the wake-up signal to the terminal in order to wake it up;

the security control module comprises a microprogram controller, and a communication interface controller connected to the microprogram controller and the communication interface unit;

wherein the communication interface controller is configured to receive the information received by the WWAN module via the communication interface unit, and send the information to the microprogram controller, the microprogram controller is configured to perform security validation on information received from the communication interface controller according to stored security validation information, and to generate and send the wake-up signal to the terminal via the communication interface controller and the communication interface unit; and the microprogram controller is further configured to send, when the terminal is in a power-off state or the sleep state, a first control signal to the communication interface controller to control it to be in a work state, and to send, when the terminal is in a power-on state, a second control signal to the communication interface controller to control it to be in an off state;

wherein the terminal comprises a power module capable of supplying power to the security control module when the terminal is in the power-off state or the sleep state, wherein the power module comprises a voltage converter and a spare voltage converter, the voltage converter being used in supplying the security control module when terminal is in the power-off state or the sleep state, and the spare voltage converter being used in supplying the security control module when the terminal is in the power-on state.

12. The terminal according to claim 11, further comprising an embedded controller configured to receive wake-up signal from the communication interface unit and to start the terminal according to the received wake-up signal.

13. The terminal according to claim 11, wherein the security control module further comprises a storage unit connected with the microprogram controller;

wherein the storage unit is configured to store the security validation formation.

14. The terminal according to claim 11, wherein the power module further comprises a power adapter/battery unit connected with the voltage converter and the spare voltage converter;

the embedded controller is configured to generate an enable signal for the voltage converter to supply the security control module and the communication interface module when the terminal is in the power-off state or the sleep state, and generate an enable signal for the spare voltage converter to supply the security control module and the communication interface module when the terminal is in the power-on state, the power converter is configured to step down the voltage from the power adapter/battery unit to supply the security control module and the communication interface module according to the enable signal from the embedded controller when the terminal is in the power-off state or the sleep state, and the spare voltage converter is configured to step down the voltage from the power adapter/battery unit to supply the security control module and the communication interface module according to the enable signal from the embedded controller when the terminal is in the power-off state or the sleep state.

15. The terminal according to claim 11, wherein the communication interface controller is disposed in the south bridge of the terminal.

* * * * *